US012414585B2

(12) United States Patent
Smith et al.

(10) Patent No.: US 12,414,585 B2
(45) **Date of Patent: *Sep. 16, 2025**

(54) ELECTRONIC SMOKING DEVICE

(71) Applicant: Fontem Ventures B.V., Amsterdam (NL)

(72) Inventors: Simon James Smith, Hertford (GB); Christopher James Rosser, Cambridge (GB)

(73) Assignee: Fontem Ventures B.V., Amsterdam (NL)

( * ) Notice: Subject to any disclaimer, the term of this patent is extended or adjusted under 35 U.S.C. 154(b) by 270 days.

This patent is subject to a terminal disclaimer.

(21) Appl. No.: 18/107,878

(22) Filed: Feb. 9, 2023

(65) Prior Publication Data

US 2023/0180829 A1 Jun. 15, 2023

Related U.S. Application Data

(63) Continuation of application No. 17/398,627, filed on Aug. 10, 2021, now abandoned, which is a (Continued)

(30) Foreign Application Priority Data

Jul. 22, 2016 (EP) .................................... 16180789

(51) Int. Cl.
*A24F 40/42* (2020.01)
*A24F 40/44* (2020.01)
(Continued)

(52) U.S. Cl.
CPC .............. *A24F 40/42* (2020.01); *A24F 40/44* (2020.01); *H05B 3/42* (2013.01); *A24F 40/10* (2020.01)

(58) Field of Classification Search
CPC ................................. A24F 40/42; A24F 40/44
See application file for complete search history.

(56) References Cited

U.S. PATENT DOCUMENTS 2,057,353 A 10/1936 Whittemore, Jr.
8,714,161 B2 5/2014 Liu
(Continued)

FOREIGN PATENT DOCUMENTS

CA 2641869 A1 5/2010
CN 201079011 Y 7/2008
(Continued)

*Primary Examiner* — Sean Kayes
(74) *Attorney, Agent, or Firm* — Dykema Gossett PLLC

(57) ABSTRACT

An electronic smoking device (10) comprises a power supply/atomizer portion (12) and a replaceable liquid reservoir portion (14) which is coupleable with the power supply/atomizer portion (12). The liquid reservoir portion comprises a liquid reservoir (34) storing a liquid and the power supply/atomizer portion comprises a power supply (18) and an atomizer (26) adapted to atomize the liquid stored in the liquid reservoir when operated by the power supply. The power supply/atomizer portion comprises a penetrating element (40) that is configured to penetrate the liquid reservoir when the power supply/atomizer portion is coupled with the liquid reservoir portion, and a wick (30). The wick (30) is attached to the penetrating element and is configured so that a portion (31) of the wick entering the liquid reservoir when the power supply/atomizer portion is coupled with the liquid reservoir portion has a U-shape.

32 Claims, 3 Drawing Sheets

Related U.S. Application Data continuation of application No. 16/319,193, filed as application No. PCT/EP2017/068439 on Jul. 21, 2017, now Pat. No. 11,109,621.

(51) Int. Cl.
*H05B 3/42* (2006.01)
*A24F 40/10* (2020.01)

(56) References Cited

U.S. PATENT DOCUMENTS 8,794,231 B2 8/2014 Thorens et al.
9,095,175 B2* 8/2015 Terry ................ A61M 15/0035
9,259,035 B2 2/2016 Terry et al.
9,462,832 B2* 10/2016 Lord ....................... A24F 40/60
9,772,216 B2 9/2017 Poole et al.
9,814,263 B2 11/2017 Cochand et al.
10,098,381 B2 10/2018 Kane et al.
10,159,279 B2 12/2018 Lord et al.
10,244,793 B2 4/2019 Monsees et al.
10,274,539 B2 4/2019 Novak, III et al.
10,279,934 B2 5/2019 Christensen et al.
10,512,283 B2 12/2019 Buehler et al.
10,653,186 B2 5/2020 Verleur et al.
10,750,786 B2 8/2020 Yener
10,834,969 B2 11/2020 Godfrey et al.
10,863,771 B2 12/2020 Borkovec et al.
10,865,001 B2 12/2020 Atkins et al.
11,109,621 B2* 9/2021 Smith ..................... A24F 40/44
11,400,467 B2 8/2022 Manca et al.
2005/0016550 A1 1/2005 Katase
2008/0230052 A1 9/2008 Montaser
2009/0188490 A1 7/2009 Han
2009/0230117 A1* 9/2009 Fernando ................. H05B 3/20 219/490
2010/0307518 A1 12/2010 Wang
2011/0011396 A1 1/2011 Fang
2011/0036346 A1 2/2011 Cohen et al.
2011/0094523 A1 4/2011 Thorens et al.
2011/0210746 A1* 9/2011 Yugou ..................... B60L 50/51 324/427
2011/0265806 A1* 11/2011 Alarcon .................. A24F 40/90 131/273
2011/0278189 A1 11/2011 Terry et al.
2011/0304282 A1* 12/2011 Li ........................... A24F 40/50 315/362
2012/0255567 A1 10/2012 Rose et al.
2013/0056013 A1 3/2013 Terry et al.
2013/0068239 A1 3/2013 Youn
2013/0081642 A1 4/2013 Safari
2013/0192615 A1 8/2013 Tucker et al.
2013/0213419 A1 8/2013 Tucker et al.
2013/0228191 A1 9/2013 Newton
2013/0255702 A1 10/2013 Griffith, Jr. et al.
2014/0069424 A1 3/2014 Poston et al.
2014/0109921 A1 4/2014 Chen
2014/0182609 A1 7/2014 Liu
2014/0261408 A1 9/2014 Depiano et al.
2014/0261487 A1 9/2014 Chapman et al.
2014/0261491 A1 9/2014 Hawes
2014/0261495 A1 9/2014 Novak, III et al.
2014/0283855 A1 9/2014 Hawes et al.
2014/0283859 A1 9/2014 Minskoff et al.
2014/0366898 A1 12/2014 Monsees et al.
2015/0020822 A1 1/2015 Janardhan et al.
2015/0027454 A1 1/2015 Li et al.
2015/0059787 A1 3/2015 Qiu
2015/0114408 A1* 4/2015 Lord ....................... A24F 40/53 131/329
2015/0136153 A1* 5/2015 Lord ....................... A24F 40/90 131/328
2015/0136158 A1* 5/2015 Stevens ................ A61M 11/042 131/329
2015/0237917 A1* 8/2015 Lord ........................ G01K 1/20 131/328
2015/0245659 A1 9/2015 Depiano et al.
2015/0245660 A1* 9/2015 Lord ....................... A24F 40/53 131/328
2015/0342258 A1* 12/2015 Chen ....................... A24F 40/44 131/329
2015/0351456 A1* 12/2015 Johnson .................. A24F 40/30 131/329
2016/0021930 A1* 1/2016 Minskoff ................ A24F 40/51 392/395
2016/0058073 A1* 3/2016 Chen ....................... A24F 40/40 392/398
2016/0081395 A1* 3/2016 Thorens .................. F22B 1/284 392/390
2016/0106155 A1 4/2016 Reevell
2016/0128386 A1* 5/2016 Chen ........................ H05B 3/44 131/329
2016/0128387 A1* 5/2016 Chen ....................... A24F 40/40 392/386
2016/0150823 A1* 6/2016 Liu .......................... H05B 3/46 131/328
2016/0150828 A1* 6/2016 Goldstein ................ H05B 6/36 392/387
2016/0157523 A1* 6/2016 Liu ....................... A61M 15/06 392/395
2016/0174611 A1* 6/2016 Monsees ................. A24F 40/50 392/386
2016/0192705 A1* 7/2016 Borkovec ............... A24F 40/90 131/328
2016/0206000 A1* 7/2016 Lord ....................... A24F 40/53
2016/0213066 A1 7/2016 Zitzke et al.
2016/0255876 A1 9/2016 Rostami
2017/0013878 A1 1/2017 Schuler et al.
2017/0071251 A1 3/2017 Goch
2017/0135402 A1* 5/2017 Zitzke ..................... A24F 40/65
2017/0215485 A1 8/2017 Zitzke
2017/0258143 A1 9/2017 Lederer
2017/0273359 A1 9/2017 Liu
2017/0273360 A1 9/2017 Brinkley et al.
2017/0280767 A1 10/2017 Li et al.
2017/0280769 A1 10/2017 Karles et al.
2017/0280771 A1 10/2017 Courbat et al.
2017/0280775 A1 10/2017 Manca et al.
2017/0290369 A1 10/2017 Norasak
2017/0325504 A1 11/2017 Liu
2018/0042306 A1 2/2018 Atkins et al.
2018/0116284 A1 5/2018 Biel et al.
2018/0153218 A1 6/2018 Verleur et al.
2019/0124982 A1 5/2019 Atkins et al.
2019/0150520 A1 5/2019 Fraser et al.
2022/0240588 A1 8/2022 Wong

FOREIGN PATENT DOCUMENTS

CN 102014677 A 4/2011
CN 201781984 U 4/2011
CN 102655773 A 9/2012
CN 104126873 A 11/2014
CN 104602552 A 5/2015
CN 105578912 A 5/2016
CN 105764366 A 7/2016
CN 105792687 A 7/2016
EP 2022349 A1 2/2009
EP 2885986 A1 6/2015
EP 2965641 A1 1/2016
WO 2012043941 A1 4/2012
WO 2013159245 A1 10/2013
WO 2015071703 A1 5/2015

* cited by examiner

ELECTRONIC SMOKING DEVICE

CROSS-REFERENCE TO RELATED APPLICATIONS

This application is a continuation of U.S. application Ser. No. 17/398,627, filed 10 Aug. 2021 (the '627 application), which is a continuation of U.S. application Ser. No. 16/319,193, filed 18 Jan. 2019 (the '193 application), now U.S. Pat. No. 11,109,621 B2, issued 7 Sep. 2021, which is the United States national stage application of international application no. PCT/EP2017/068439, filed 21 Jul. 2017 (the '439 application) and published in English under international publication no. WO 2018/015521 A1 on 25 Jan. 2018, which claims priority to European application no. 16180789.6, filed 22 Jul. 2016 (the '789 application), now European patent no. EP 3,272,236 B1, issue 16 Jun. 2021. The '627 application, the '193 application, the '439 application, and the '789 application are all hereby incorporated by reference in their entirety as though fully set forth herein.

FIELD OF INVENTION

The present invention relates generally to electronic smoking devices and in particular to electronic cigarettes.

BACKGROUND OF THE INVENTION

An electronic smoking device, such as an electronic cigarette (e-cigarette), typically has a housing accommodating an electric power source (e.g. a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an air flow pattern through the device). The airflow sensor indicates or signals the puff to the control electronics to power up the device and generate vapor. In other e-cigarettes, a switch is used to power up the e-cigarette to generate a puff of vapor.

Constant supply of liquid to the atomizer has to be ensured.

SUMMARY OF THE INVENTION

In accordance with one aspect of the present invention there is provided an electronic smoking device comprising a power supply/atomizer portion and a replaceable liquid reservoir portion which is coupleable with the power supply/atomizer portion. The liquid reservoir portion comprises a liquid reservoir storing a liquid. The power supply/atomizer portion comprises a power supply and an atomizer adapted to atomize the liquid stored in the liquid reservoir when operated by the power supply. The power supply/atomizer portion comprises a penetrating element that is configured to penetrate the liquid reservoir when the power supply/atomizer portion is coupled with the liquid reservoir portion. The power supply/atomizer portion further comprises a wick that is attached to the penetrating element and is configured so that a portion of the wick entering the liquid reservoir when the power supply/atomizer portion is coupled with the liquid reservoir portion has a U-shape.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views.

DESCRIPTION OF THE PREFERRED EMBODIMENTS

Figure 1:
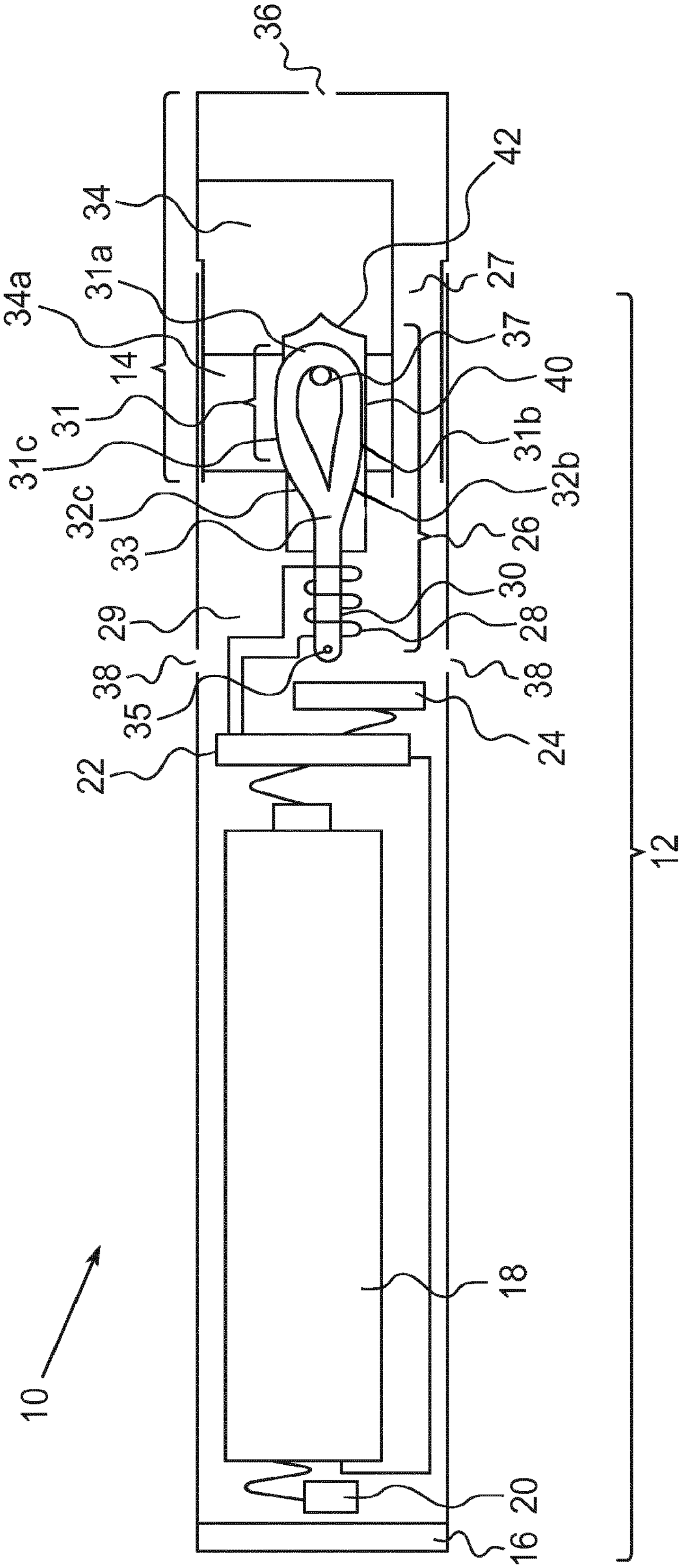
FIG. 1 is a schematic cross-sectional illustration of an exemplary electronic cigarette.

Throughout the following, an electronic smoking device will be exemplarily described with reference to an e-cigarette. As is shown in FIG. 1, an e-cigarette 10 typically has a housing comprising a cylindrical hollow tube having an end cap 16. The cylindrical hollow tube may be a single-piece or a multiple-piece tube. In FIG. 1, the cylindrical hollow tube is shown as a two-piece structure having a power supply/atomizer portion 12 and a liquid reservoir portion 14. Together the power supply/atomizer portion 12 and the liquid reservoir portion 14 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply/atomizer portion 12 and the liquid reservoir portion 14 are typically made of metal, e.g. steel or aluminum, or of hardwearing plastic and act together with the end cap 16 to provide a housing to contain the components of the e-cigarette 10. The power supply/atomizer portion 12 and a liquid reservoir portion 14 may be configured to fit together by a friction push fit, a snap fit, or a bayonet attachment, magnetic fit, or screw threads. The end cap 16 is provided at the front end of the power supply portion 12. The end cap 16 may be made from translucent plastic or other translucent material to allow a light-emitting diode (LED) 20 positioned near the end cap to emit light through the end cap. The end cap can be made of metal or other materials that do not allow light to pass.

An air inlet may be provided in the end cap, at the edge of the inlet next to the cylindrical hollow tube, anywhere along the length of the cylindrical hollow tube, or at the connection of the power supply/atomizer portion 12 and the liquid reservoir portion 14. FIG. 1 shows a pair of air inlets 38 provided approximately in the middle the cylindrical hollow tube.

A power supply, preferably a battery 18, an LED 20, control electronics 22 and optionally an airflow sensor 24 are provided within the cylindrical hollow tube power supply/atomizer portion 12. The battery 18 is electrically connected to the control electronics 22, which are electrically connected to the LED 20 and the airflow sensor 24. In this example the LED 20 is at the front end of the power supply/atomizer portion 12, adjacent to the end cap 16 and the control electronics 22 and airflow sensor 24 are provided in the central cavity at the other end of the battery 18 adjacent the liquid reservoir portion 14.

The airflow sensor 24 acts as a puff detector, detecting a user puffing or sucking on the liquid reservoir portion 14 of the e-cigarette 10. The airflow sensor 24 can be any suitable sensor for detecting changes in airflow or air pressure, such as a microphone switch including a deformable membrane which is caused to move by variations in air pressure. Alternatively the sensor may be a Hall element or an electro-mechanical sensor.

The control electronics 22 are also connected to an atomizer 26. In the example shown, the atomizer 26 includes a heating coil 28 which is wrapped around a wick 30 extending inside an atomizing chamber 29 that is connected to an air passage 27. The wick 30 and heating coil 28 do not completely block the atomizing chamber 29. Rather an air gap is provided on either side of the heating coil 28 enabling air to flow past the heating coil 28 and the wick 30. The atomizer may alternatively use other forms of heating elements, such as ceramic heaters, or fiber or mesh material heaters. Nonresistance heating elements such as sonic, piezo and jet spray may also be used in the atomizer in place of the heating coil.

The wick 30 may be a porous material such as a bundle of fiberglass fibers, with liquid in the liquid reservoir 34 drawn by capillary action from the portion 31 of the wick 30 that extends into the liquid reservoir towards the portion of the wick 30 encircled by the heating coil 28.

The liquid reservoir portion 14, which is replaceable and which is shown in FIG. 1 in a state coupled with the power supply/atomizer portion 12, includes the liquid reservoir 34 that is adapted for storing liquid to be atomized or vaporized. In the embodiment according to FIG. 1, the liquid reservoir 34 further comprises a plug of reservoir material 34*a*. The reservoir material 34*a* can alternatively fill a larger portion or the entire cavity that forms part of the liquid reservoir 34. The plug of reservoir material 34a may serve to prevent leakage of fluid from the liquid reservoir 34. Further, the liquid reservoir material 34a is configured to form a capillary connection to the portion 31 of the wick 30 that enters the liquid reservoir 34 when the power supply/atomizer portion 12 is coupled with the liquid reservoir portion 14. The reservoir material 34*a* may, for example, comprise a porous material that is soaked in liquid stored in the liquid reservoir 34. The reservoir material 34*a* may be elastic, i.e. non-permanently deformable, e.g. like foam, or permanently deformable.

The power supply/atomizer portion 12 includes a penetrating element 40 that is configured to penetrate the liquid reservoir 34 when the power supply/atomizer portion 12 is coupled with the liquid reservoir portion 14. The wick 30 is attached to the penetrating element 40 and is configured so that a portion 31 of the wick 30 entering the liquid reservoir 34 when the power supply/atomizer 12 portion is coupled with the liquid reservoir portion 12 has a U-shape.

The U-shaped portion 31 of the wick 30 includes a bending portion 31*a* and two leg portions 31*b*, 31*c*. Extensions 32*b*, 32*c* of the leg portions 31*b*, 31*c* extend towards the heating coil 28 and the bending portion 31*a* faces the liquid reservoir 34 when the power supply/atomizer portion 12 is coupled with the liquid reservoir portion 14.

Compared to a simple single stranded wick entering the liquid reservoir 34, the U-shaped wick portion 31 provides the advantage that a greater surface for liquid transport is provided, thereby effectively improving the liquid feed to the heating element 28.

The penetrating element 40 comprises a piercing element 42 at the end facing the liquid reservoir 34. The piercing element 42 is configured to pierce the reservoir material 34*a* when the power supply/atomizer portion 12 is coupled with the liquid reservoir portion 14. The piercing element 42 can be formed using a spike, a blade or the like. By means of the piercing element 42, the U-shaped portion 31 of the wick 30 easily enters the liquid reservoir material 34*a* when the power supply/atomizer portion 12 is coupled with the liquid reservoir portion 14.

To avoid deformation and/or dislocation of the wick portion 31 when the power supply/atomizer portion 12 is coupled with the liquid reservoir portion 14, the wick 30 is suitably attached to the power supply/atomizer portion 12. In particular, the wick 30 is attached to the penetrating element 40 so that the wick 30 is kept under tension. To that end, the one end of the wick 30 facing away from the liquid reservoir 34 is fixed by means of a suitable fixing element 35, such as a fixing pin. The other end of the wick 30 facing the liquid reservoir 34, namely the U-shaped portion 31, is attached to the penetrating element 40 by hooking the bending portion 31*a* of the U-shaped portion 31 of the wick 30 into a holding portion 37 of the penetrating element 40. The holding portion 37 may be formed as a pin or hook. Alternatively, the holding portion may be formed by a recess in the penetrating element 40 through which the wick 30 is threaded in the area of the bending portion 31*a*.

Attaching the wick 30 to the penetrating element 40 in this way first assures that the wick 30 is not deformed, i.e. bent back, when the power supply/atomizer portion 12 is coupled with the liquid reservoir 14, but properly enters the liquid reservoir 34. Further, due to the attachment, the wick 30 properly contacts with the liquid reservoir material 34*a*, thereby establishing a capillary contact with the liquid reservoir material 34*a* which improves liquid feed towards the heating element 28. Capillary action keeps the wick 30 saturated while the liquid reservoir 34 contains liquid.

Preferably, at least one extension 32*b*, 32*c* of a leg portion 31*b*, 31*c* of the U-shaped portion 31 of the wick 30 is wrapped by the heating coil 28 of the power supply/atomizer portion. In the example shown in FIG. 1, the two extensions 32*b*, 32*c* of the leg portion 31*b*, 31*c* of the U-shaped portion 31 rejoin to form a single stranded wick portion 33. In other words, the U-shaped portion 31 forms part of some sort of closed loop formed at the end of the wick 31 facing the liquid reservoir 34. In this case, the single stranded wick portion 33 is wrapped by the heating coil 28 of the power supply/atomizer portion 12. Alternative embodiments are described below with reference to FIGS. 2 and 3.

By means of a one-way design, e.g., by providing the liquid reservoir portion 14 with a slanted face (not shown) on the end to be coupled with the power supply/atomizer portion 12, misalignment of the liquid reservoir portion 14 with respect to the power supply/atomizer portion 12 can be avoided.

As shown in FIG. 1, the piercing portion 42 does not protrude from the power supply/atomizer portion 12, but is rather arranged in a retracted manner, subflush with the outer sleeve of the power supply atomizer portion 12. In this way, a direct contact with the piercing portion 42 can be avoided when no liquid reservoir portion 14 is coupled to the power supply/atomizer portion 12.

An air inhalation port 36 is provided at the back end of the liquid reservoir portion 14 remote from the end cap 16. The inhalation port 36 may be formed from the cylindrical hollow tube liquid reservoir portion 14 or maybe formed in an end cap.

In use, a user sucks on the e-cigarette 10. This causes air to be drawn into the e-cigarette 10 via one or more air inlets, such as air inlets 38, and to be drawn through the atomizing chamber 29 and the air passage 27 towards the air inhalation port 36. The change in air pressure which arises is detected by the airflow sensor 24, which generates an electrical signal that is passed to the control electronics 22. In response to the signal, the control electronics 22 activate the heating coil 28, which causes liquid present in the wick 30 to be vaporized creating an aerosol (which may comprise gaseous and liquid components) within the atomizing chamber 29. As the user continues to suck on the e-cigarette 10, this aerosol is drawn through the air passage 27 and inhaled by the user. At the same time the control electronics 22 also activate the LED 20 causing the LED 20 to light up which is visible via the translucent end cap 16 mimicking the appearance of a glowing ember at the end of a conventional cigarette. As liquid present in the wick 30 is converted into an aerosol more liquid is drawn into the wick 30 from the liquid reservoir 34 by capillary action and thus is available to be converted into an aerosol through subsequent activation of the heating coil 28. As already mentioned above, the U-shaped design of the wick portion 31 entering the liquid reservoir improves liquid feed to the heating element 28.

Some e-cigarettes are intended to be disposable and the electric power in the battery 18 is intended to be sufficient to vaporize the liquid contained within the liquid reservoir 34, after which the e-cigarette 10 is thrown away. In other embodiments the battery 18 is rechargeable and the liquid reservoir 34 is refillable. In the cases where the liquid reservoir 34 is a toroidal cavity, this may be achieved by refilling the liquid reservoir 34 via a refill port. In other embodiments, as described with reference to FIG. 1, the liquid reservoir portion 14 of the e-cigarette 10 is detachable from the power supply portion/atomizer portion 12 and a new liquid reservoir portion 14 can be fitted with a new liquid reservoir 34 thereby replenishing the supply of liquid. In some cases, replacing the liquid reservoir 34 may involve replacement of the heating coil 28 and the wick 30 along with the replacement of the liquid reservoir 34. A replaceable unit comprising the atomizer 26 and the liquid reservoir 34 is called a cartomizer.

The new liquid reservoir 34 may be in the form of a cartridge having an air passage 27 through which a user inhales aerosol. In other embodiments, aerosol may flow around the exterior of the cartridge to an air inhalation port 36.

Of course, in addition to the above description of the structure and function of a typical e-cigarette 10, variations also exist. For example, the LED 20 may be omitted. The airflow sensor 24 may be placed adjacent the end cap 16 rather than in the middle of the e-cigarette. The airflow sensor 24 may be replaced with a switch which enables a user to activate the e-cigarette manually rather than in response to the detection of a change in air flow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively, the atomizer may use a piezoelectric atomizer to create an aerosol either in combination or in the absence of a heater.

Figure 2:
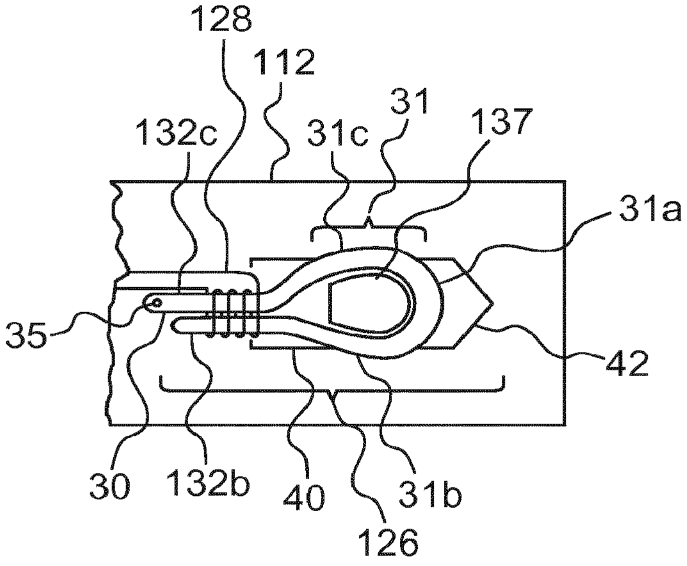
FIG. 2 is a schematic partial cross-sectional view of a power supply/atomizer portion according to an embodiment.

FIG. 2 is a schematic partial cross-sectional view of a power supply/atomizer portion 112 according to an embodiment.

In contrast to the embodiment shown in FIG. 1, the two extensions 132*b*, 132*c* of the two leg portions 31*b*, 31*c* do not completely rejoin to form a single stranded wick portion, but remain separate linear wick portions that are arranged adjacent to each other. The two extensions 132*b*, 132*c* of leg portions 31*b*, 31*c* of the U-shaped portion 31 of the wick 30 are wrapped by a single heating coil 128 of the power supply/atomizer portion 112. This configuration has the advantage that it can be easily manufactured. Due to the fact that the heating coil 128 is wrapped around both extensions of the leg portions, twice the amount of liquid is available for vaporization compared to the case where only a single leg extension is surrounded by the heating coil 128. The two extensions 132*b*, 132*c* can e.g. be kept together by tightly winding the heating coil 128 around the extensions 132*b*, 132*c*.

Further, in contrast to the embodiment shown in FIG. 1, where a simple holding portion 37 in the form of a pin or the like has been shown in order to hook in the looped wick 30, holding portion 137 is configured to further support the U-shaped portion 31 of the wick 30 in the longitudinal direction. This has the advantage that the wick 30 even better remains in place when the power supply/atomizer portion 112 is coupled with the liquid reservoir portion 14, so that the wick 30 can be pressed against the reservoir material 34*a* without moving back. Constant and reliable capillary contact between the wick 30 and the reservoir material 34*a* is thereby ensured.

Apparently, these two differentiating features are independent from each other.

Figure 3:
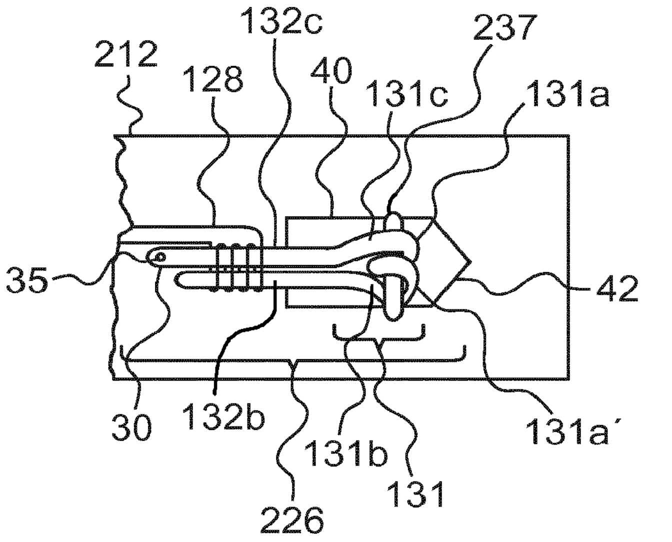
FIG. 3 is a schematic partial cross-sectional view of a power supply/atomizer portion according to another embodiment.

FIG. 3 is a schematic partial cross-sectional view of a power supply/atomizer portion 212 according to another embodiment.

This embodiment mainly serves to point out that the term "U-shaped" has to be interpreted broadly in the context of the present invention. U-shaped means that there is a continuous linear wick portion that, on one end includes a first leg portion 131*b* and on the other end includes a second leg portion 131*c*, wherein both leg portions 131*b*, 131*c* are arranged in the power supply/atomizer portion to be essentially parallel, and wherein the two leg portions 131*b*, 131*c* are connected by at least one curved or bended portion 131*a*, 131*a'* (cf. 31*a* in FIGS. 1 and 2). However, in the context of the present invention, the term "U-shaped" also includes cases where the simple bending portion 31*a* that connects the two leg portions 31*b*, 31*c* in the form of a semi-circular arc is replaced by a more complex or irregular portion of the linear wick, which portion may include an irregular curved course and/or may include more than one bending portion 131*a*, 131*a'*, which bending portions may be differently curved. In the embodiment shown in FIG. 3, the wick 30 is wound around the holding portion 237, for example a holding pin, twice and therefore includes two bending portions 131*a*, 131*a'* facing the liquid reservoir 34—and one bending portion facing in the opposite direction. Compared to FIGS. 1 and 2, this embodiment provides an even greater surface area for liquid flow when the power supply/atomizer portion 212 is coupled to the liquid reservoir portion 14.

Figure 4:
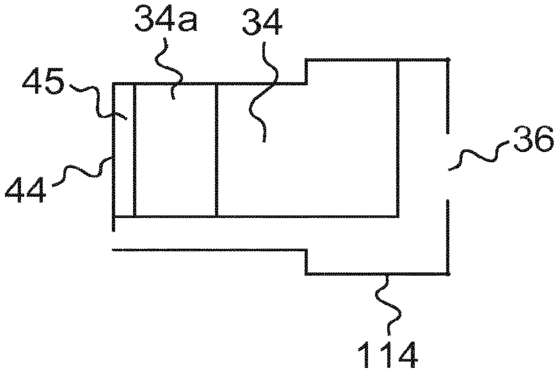
FIG. 4 is a schematic cross-sectional view of a liquid reservoir portion for an electronic cigarette according to FIG. 1.

FIG. 4 is a schematic cross-sectional view of a liquid reservoir portion 114 for an electronic cigarette according to FIG. 1.

In addition to the liquid reservoir portion 14 shown in FIG. 1, the liquid reservoir portion 114 according to FIG. 4 includes a sealing element 44 which is configured to seal an opening 45 of the liquid reservoir 34 to be penetrated by the penetrating element 40 before the power supply/atomizer portion 12 is coupled with the liquid reservoir portion 114. The sealing element 44 can be a heat sealed foil or the like. The sealing element 44 provides two functions. First, the sealing element 44 ensures containment of the liquid within the liquid reservoir 34 before the power supply/atomizer portion 12 is coupled with the liquid reservoir portion 114. Second, an intact sealing element 44 indicates an unused liquid reservoir 34.

The sealing element 44 is configured to be peeled off before the power supply/atomizer portion 12 is coupled with the liquid reservoir portion 14.

Alternatively or additionally, the piercing element 42 can be configured to pierce the sealing element 44 when the power supply/atomizer portion 12 is coupled with the liquid reservoir portion 14. Thereby, the step of peeling off the sealing element can be avoided.

In case the sealing element 44 is configured so that it still provides a sealing function when punctured by the piercing element 42, the plug of liquid reservoir material 34*a* may be dispensable.

Figure 5:
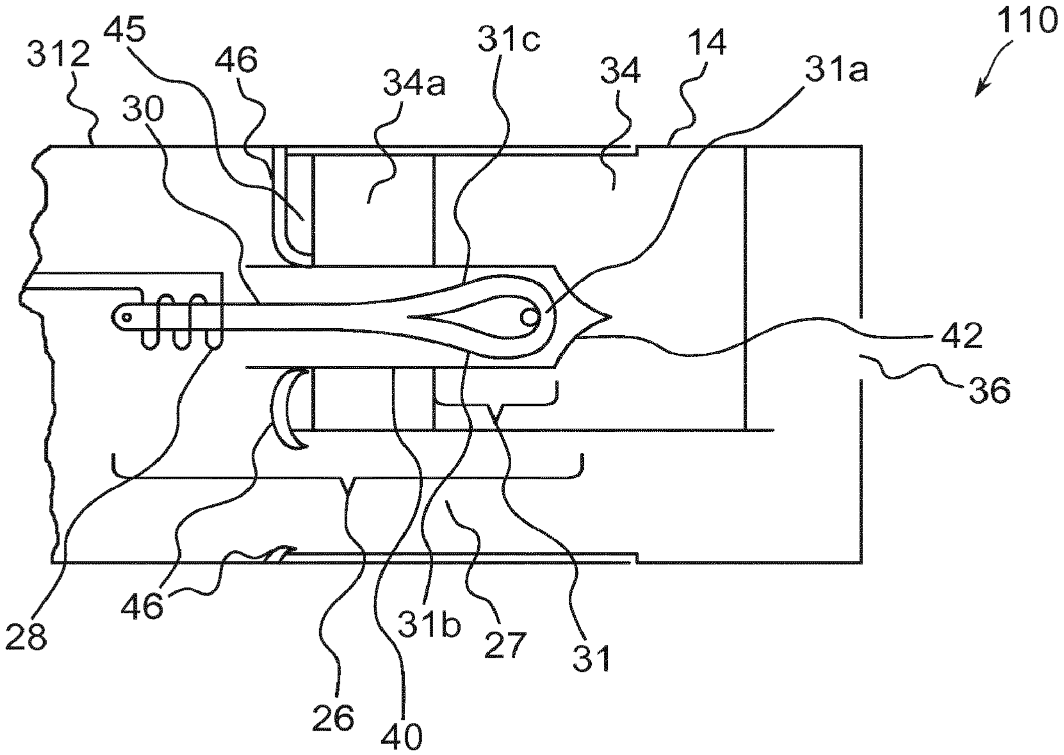
FIG. 5 is a schematic partial cross-sectional view of an embodiment of the electronic cigarette.

FIG. 5 is a schematic partial cross-sectional view of an embodiment of an electronic cigarette.

In FIG. 5, another type of sealing element 46 is shown, which is not present in FIG. 1. The sealing element 46, in the form of a compliant seal, is part of the power supply/atomizer portion 312. The sealing element 46 is configured, when the power supply/atomizer portion 312 is coupled with the liquid reservoir portion 14, to form both an air seal around the air passage 27 of the liquid reservoir portion 14 and a liquid seal around the opening 45 of the liquid reservoir 34 of the liquid reservoir portion 14. The sealing element 46 is in particular intended to form some sort of bulkhead between the liquid reservoir portion 14 and the power supply/atomizer portion 312, in order to prevent liquid from flowing into the power supply/atomizer portion 312 in an uncontrolled manner. The sealing element 46 can e.g. be provided in the form of a face seal or radial seal.

In summary, in one aspect the electronic smoking device has a power supply/atomizer portion and a replaceable liquid reservoir portion which is coupleable with the power supply/atomizer portion. The liquid reservoir portion comprises a liquid reservoir storing a liquid and the power supply/atomizer portion comprises a power supply and an atomizer adapted to atomize the liquid stored in the liquid reservoir when operated by the power supply. The power supply/atomizer portion further comprises a penetrating element that is configured to penetrate the liquid reservoir when the power supply/atomizer portion is coupled with the liquid reservoir portion, and a wick. The wick is attached to the penetrating element and is configured so that a portion of the wick entering the liquid reservoir when the power supply/atomizer portion is coupled with the liquid reservoir portion has a U-shape.

According to an embodiment, the penetrating element comprises a piercing element and the liquid reservoir includes a reservoir material at least partially filling the liquid reservoir. The piercing element is configured to pierce the reservoir material when the power supply/atomizer portion is coupled with the liquid reservoir portion.

According to an embodiment, a bending portion of the U-shaped portion of the wick faces the liquid reservoir when the power supply/atomizer portion is coupled with the liquid reservoir portion.

According to an embodiment, at least one extension of a leg portion of the U-shaped portion of the wick is wrapped by a heating coil of the power supply/atomizer portion. Preferably, two extensions of leg portions of the U-shaped portion of the wick are wrapped by a single heating coil of the power supply/atomizer portion.

According to an embodiment, two extensions of leg portions of the U-shaped portion of the wick rejoin to form a single stranded wick portion. The single stranded wick portion can be wrapped by a single heating coil of the power supply/atomizer portion.

According to an embodiment, the wick is attached to the penetrating element so that the wick is kept under tension. The bending portion of the U-shaped portion of the wick can be hooked into a holding portion of the penetrating element.

According to an embodiment, the U-shaped portion of the wick is configured to form a capillary connection to the reservoir material of the liquid reservoir when the power supply/atomizer portion is coupled with the liquid reservoir portion.

According to an embodiment, an opening of the liquid reservoir to be penetrated by the penetrating element of the power supply/atomizer portion is closed by means of a sealing element before the power supply/atomizer portion is coupled with the liquid reservoir portion. The sealing element can be configured to be peeled off before the power supply/atomizer portion is coupled with the liquid reservoir portion.

According to an embodiment, the piercing element is configured to pierce the sealing element of the liquid reservoir portion when the power supply/atomizer portion is coupled with the liquid reservoir portion.

According to an embodiment, the power supply/atomizer portion includes another sealing element that is configured, when the power supply/atomizer portion is coupled with the liquid reservoir portion, to form both an air seal around an air passage of the liquid reservoir portion and a liquid seal around an opening of the liquid reservoir of the liquid reservoir portion.

According to a second aspect, a power supply/atomizer portion of an electronic smoking device is provided, which power supply/atomizer portion is configured to be coupled with a replaceable liquid reservoir portion for the electronic smoking device. The liquid reservoir portion comprises a liquid reservoir storing a liquid. The power supply/atomizer portion comprises a power supply and an atomizer adapted to atomize the liquid stored in the liquid reservoir when the power supply/atomizer portion is coupled with the liquid reservoir portion and when the atomizer is operated by the power supply. The power supply/atomizer portion further comprises a penetrating element that is configured to penetrate the liquid reservoir when the power supply/atomizer portion is coupled with the liquid reservoir portion, and a wick. The wick is attached to the penetrating element so that a portion of the wick entering the liquid reservoir when the power supply/atomizer portion is coupled with the liquid reservoir portion has a U-shape.

Preferred features of the power supply/atomizer portion according to the second aspect have already been mentioned with respect to the electronic smoking device according to the first aspect.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS

10, 110 electronic smoking device
12, 112, 212, 312 power supply/atomizer portion
14, 114 liquid reservoir portion
16 end cap
18 battery
20 light-emitting diode (LED)
22 control electronics
24 airflow sensor
26, 126, 226 atomizer
27 air passage
28, 128 heating coil
29 atomizing chamber
30 wick
31 U-shaped portion of wick
31*a*, 131*a*, 131*a'* bending portion of U-shaped portion
31*b*, 31*c*, 131*b*, 131*c* leg portion of U-shaped portion
32*b*, 32*c*, 132*b*, 132*c* extension portion of leg portion
33 single stranded wick portion
34 liquid reservoir
34*a* reservoir material
35 fixing element
36 air inhalation port
37, 137, 237 holding portion
38 air inlets
40 penetrating element
42 piercing element
44 sealing element
45 opening
46 sealing element

The invention claimed is:

1. A power supply/atomizer portion for an electronic smoking device that is configured to be coupled with a liquid reservoir portion for the electronic smoking device, wherein the liquid reservoir portion comprises a liquid reservoir, and wherein the power supply/atomizer portion comprises the following:

a power supply;

an atomizer adapted to atomize a liquid stored in the liquid reservoir of the liquid reservoir portion when the power supply/atomizer portion is coupled with the liquid reservoir portion and when the atomizer is activated by the power supply; and a sealing element that is configured to form, when the power supply/atomizer portion is coupled with the liquid reservoir portion, both an air seal around an air passage of the liquid reservoir portion and a liquid seal around an opening of the liquid reservoir of the liquid reservoir portion.

2. The power supply/atomizer portion according to claim 1 further comprising a penetrating element comprising a piercing element, wherein the liquid reservoir is at least partially filled with a reservoir material, and wherein the piercing element is configured to pierce the reservoir material when the power supply/atomizer portion is coupled with the liquid reservoir portion.

3. The power supply/atomizer portion according to claim 1 further comprising a U-shaped wick attached to the penetrating element, wherein the U-shape wick comprises a bending portion that faces the liquid reservoir when the power supply/atomizer portion is coupled with the liquid reservoir portion.

4. The power supply/atomizer portion according to claim 1 further comprising a U-shaped wick comprising at least one extension of a leg portion, wherein the atomizer further comprises a heating coil wrapped around the at least one extension.

5. The power supply/atomizer portion according to claim 1 further comprising a U-shaped wick comprising a first extension of a first leg portion and a second extension of a second leg portion, wherein the atomizer further comprises a heating coil wrapped around both the first extension and the second extension.

6. A power supply/atomizer portion for an electronic smoking device that is configured to be coupled with a replaceable liquid reservoir portion for the electronic smoking device, wherein the power supply/atomizer portion comprises:

a front end and a back end, wherein the back end is configured to be coupled with a front portion of the replaceable liquid reservoir portion;

a power supply;

an atomizer comprising a heating element adapted to atomize a liquid stored in a liquid reservoir of the liquid reservoir portion when the power supply/atomizer portion is coupled with the liquid reservoir portion and the atomizer is activated by the power supply; and a sealing element at the back end of the power supply/atomizer portion, wherein the scaling element is configured to form, when the power supply/atomizer portion is coupled with the liquid reservoir portion, both an air seal around an air passage of the liquid reservoir portion and a liquid seal around an opening of the liquid reservoir.

7. The power supply/atomizer portion according to claim 6, further comprising:

a penetrating element that is configured to penetrate the liquid reservoir when the power supply/atomizer portion is coupled with the liquid reservoir portion; and a wick attached to the penetrating element so that a portion of the wick enters the liquid reservoir when the power supply/atomizer portion is coupled with the liquid reservoir portion has a U-shape comprising two leg portions, wherein the two leg portions of the U-shaped portion of the wick extend into two extensions that are in contact with the heating element.

8. The power supply/atomizer portion according to claim 7, wherein the two extensions of the wick rejoin to form a single stranded wick portion in contact with the heating element.

9. The power supply/atomizer portion according to claim 6, further comprising:

a penetrating element comprising a back portion that is configured to penetrate the liquid reservoir when the power supply/atomizer portion is coupled with the liquid reservoir portion; and a wick comprising a front portion and a back portion, wherein the front portion of the wick is in contact with the heating element, and wherein the back portion of the wick is attached to the back portion of the penetrating element so that the back portion of the wick enters the liquid reservoir when the power supply/atomizer portion is coupled with the liquid reservoir portion.

10. The power supply/atomizer portion according to claim 9, wherein the back portion of the wick is U-shaped.

11. The power supply/atomizer portion according to claim 10, wherein the back portion of the wick comprises a bending portion that faces the liquid reservoir when the power supply/atomizer portion is coupled with the liquid reservoir portion.

12. The power supply/atomizer portion according to claim 8, wherein the back portion of the wick comprises two bending portions.

13. The power supply/atomizer portion according to claim 9, wherein the back portion of the wick further comprises a first leg portion and a second leg portion.

14. The power supply/atomizer portion according to claim 13, wherein the front portion of the wick comprises a first extension and a second extension, wherein the first leg portion extends toward the front end of the power supply/atomizer portion to become the first extension of the wick, and wherein the second leg portion extends toward the front end of the power supply/atomizer portion to become the second extension of the wick.

15. The power supply/atomizer portion according to claim 13, wherein the beating element is a heating coil, and wherein at least one of the first extension and the second extension of the wick is wrapped by the heating coil.

16. The power supply/atomizer portion according to claim 14, wherein the heating element is a heating coil, and wherein both the first extension and the second extension of the wick are wrapped by the heating coil.

17. The power supply/atomizer portion according to claim 14, wherein the first extension of the wick and the second extension of the wick rejoin to form a single stranded wick portion in contact with the heating element.

18. The power supply/atomizer portion according to claim 9, wherein the penetrating element comprises a piercing element, wherein the liquid reservoir includes a reservoir material at least partially filling the liquid reservoir, and wherein the piercing element is configured to pierce the reservoir material when the power supply/atomizer portion is coupled with the liquid reservoir portion.

19. A power supply/atomizer portion for an electronic smoking device, wherein the power supply/atomizer portion is configured to be coupled with a replaceable liquid reservoir portion comprising a liquid reservoir adapted for storing a liquid, wherein the power supply/atomizer portion comprises the following:

a power supply;

an atomizer electrically coupled to the power supply and adapted to atomize the liquid stored in the liquid reservoir when the atomizer is activated by the power supply;

a penetrating element configured to penetrate the liquid reservoir when the power supply/atomizer portion is coupled with the liquid reservoir portion;

a wick comprising a U-shaped portion is attached to the penetrating element whereby the U-shaped portion of the wick is configured to enter the liquid reservoir when the power supply/atomizer portion is coupled with the liquid reservoir portion; and a sealing element that is configured to form, when the power supply/atomizer portion is coupled with the liquid reservoir portion, both an air seal around an air passage of the liquid reservoir portion and a liquid seal around an opening of the liquid reservoir of the liquid reservoir portion.

20. The power supply/atomizer portion according to claim 19, wherein the wick further comprises two extensions, wherein the U-shaped portion comprises two leg portions, and wherein each of the two leg portions comprises one of the two extensions.

21. The power supply/atomizer portion according to claim 20 further comprising a heating element electrically coupled to the power supply, wherein the heating element is in contact with a least one of the two extensions.

22. The power supply/atomizer portion according to claim 21, wherein the heating element is selected from the group consisting of ceramic heaters, fiber material heaters, and mesh material heaters.

23. The power supply/atomizer portion according to claim 21, wherein the heating element is selected from the group consisting of sonic heaters, piezo heaters, and jet spray heaters.

24. The power supply/atomizer portion according to claim 21, wherein the heating element is in contact with the two extensions.

25. The power supply/atomizer portion according to claim 24, wherein the heating element comprises a coil wrapped around the two extensions.

26. The power supply/atomizer portion according to claim 21, where the two extensions rejoin to form a single stranded wick portion.

27. The power supply/atomizer portion according to claim 26, wherein the heating element comprises a coil wrapped around the single stranded wick portion.

28. The power supply/atomizer portion according to claim 19, wherein the penetrating element comprises a piercing element and the liquid reservoir includes a reservoir material at least partially filling the liquid reservoir, and wherein the piercing element is configured to pierce the reservoir material when the power supply/atomizer portion is coupled with the liquid reservoir portion.

29. The power supply/atomizer portion according to claim 19, wherein a bending portion of the U-shaped portion of the wick faces the liquid reservoir when the power supply/atomizer portion is coupled with the liquid reservoir portion.

30. The power supply/atomizer portion according to claim 19, wherein the wick is attached to the penetrating element so that the wick is kept under tension.

31. The power supply/atomizer portion according to claim 30, wherein a bending portion of the U-shaped portion of the wick is hooked into a holding portion of the penetrating element.

32. The power supply/atomizer portion according to claim 19, wherein the U-shaped portion of the wick is configured to form a capillary connection to a reservoir material of the liquid reservoir when the power supply/atomizer portion is coupled with the liquid reservoir portion.

* * * * *